United States Patent [19]
DeWalls et al.

[11] Patent Number: 5,614,101
[45] Date of Patent: Mar. 25, 1997

[54] METHODS FOR TREATING MUD WASH EMULSIONS

[75] Inventors: Jennifer A. DeWalls, Spring; Mark S. Binford, The Woodlands, both of Tex.

[73] Assignee: BetzDearborn Inc., Trevose, Pa.

[21] Appl. No.: 502,227

[22] Filed: Jul. 13, 1995

[51] Int. Cl.$^6$ ................................................ B01D 17/05
[52] U.S. Cl. ........................ 210/708; 208/188; 208/311; 210/728; 210/737; 252/331; 252/358
[58] Field of Search ........................ 208/187–189, 208/311; 210/708, 725, 727, 728, 732, 749, 737; 252/331, 358

[56] References Cited

U.S. PATENT DOCUMENTS

| | | | |
|---|---|---|---|
| 4,175,054 | 11/1979 | Tait et al. | 252/331 |
| 4,722,781 | 2/1988 | Swartz et al. | 210/708 |
| 4,947,885 | 8/1990 | Hart | 137/5 |
| 4,949,743 | 8/1990 | Broom | 137/13 |
| 5,080,779 | 1/1992 | Awbrey et al. | 208/252 |
| 5,085,710 | 2/1992 | Goss | 134/22.14 |
| 5,256,305 | 10/1993 | Hart | 210/708 |
| 5,449,463 | 9/1995 | Elliott et al. | 210/708 |
| 5,525,201 | 6/1996 | Diaz-Arauzo et al. | 210/708 |

FOREIGN PATENT DOCUMENTS 668884  6/1979  U.S.S.R. ................ 210/708

*Primary Examiner*—Peter A. Hruskoci
*Attorney, Agent, or Firm*—Alexander D. Ricci; Philip H. Von Neida

[57] ABSTRACT

The present invention provides for methods for treating bottoms sludge and water-oil interphase emulsions present in a containment vessel by injecting into the sludge an effective resolving amount of an oil-based demuislfier. In a preferred embodiment, the containment vessel is a desalter containing a bottoms sludge layer, a water/brine layer, a water-oil interphase emulsion layer and a hydrocarbon layer and the demulsifier is injected through the mud wash header.

8 Claims, 3 Drawing Sheets

MUD WASH SYSTEM

Fig. 2 TRYCOCK SAMPLE METHOD

API OIL SKIMMINGS

METHODS FOR TREATING MUD WASH EMULSIONS

FIELD OF THE INVENTION

The present invention relates to methods for treating bottoms sludge and oil-water interphase emulsions present in a containment vessel through application of chemical demulsifiers into vessel wash systems, such as the mud wash system of a desalter.

BACKGROUND OF THE INVENTION

During an oil-water separation process, insoluble surfactants and solids accumulate in the separator between the oil and water phases and at the bottom of the water phase. The accumulation of these components is caused by emulsions and sludges equilibrating at different levels in the oil-water separator vessel based on their bulk density. The continued accumulation of these materials can ultimately result in hydrocarbon entrainment in the aqueous effluent exiting the bottom of the vessel and also limit the ability to adequately control the level of the oil-water interphase in the vessel.

Emulsion breaking chemicals are often added ahead of the separator to aid in de-oiling the solid particles so that they can effectively migrate from the oil phase or from the emulsion interphase into the water phase. These solid particles typically include sand, silt, drilling mud, iron oxide, iron sulfide, and other naturally occurring and foreign contaminants. Heavy insoluble asphaltenic hydrocarbons can also fall out of a crude oil in a separation vessel. This de-oiling, however, is typically not complete.

The more de-oiled portion of these materials, commonly referred to as solids, stays suspended in the water phase and are thus removed from the separator vessel with the aqueous discharge. The less de-oiled, but heavier than water, portion falls to the bottom of the vessel and loosely agglomerates there, being bound by the heavy oils remaining on the solid surfaces. Over time, this solid layer will compact on the bottom of the vessel, making it increasingly difficult to remove.

Refinery desalter systems are designed to remove primarily inorganic salts from a crude oil prior to refining. The desalting step is provided by adding and mixing with the crude a few volume percentages of fresh water to contact the brine and salts present in the crude. The resulting oil-water emulsion need necessarily be separated for further processing of the crude oil. This separation is typically carried out at temperatures from 225° F. to 325° F. and pressures from 100 psi to 200 psi.

Many desalter systems are equipped with mud wash piping designed to periodically agitate the water on the bottom of the desalter and remove the accumulation of oily solids. Water is pumped into the mud wash header at rates of two to ten gallons per minute, per nozzle, exiting the nozzle as a turbulent jet directed at the bottom of the vessel.

Mud wash systems are of two basic types. The once through system uses water that is diverted from the incoming desalter wash water, whereas the recirculating system uses effluent brine diverted from the desalter. Both systems perform essentially the same function.

Mud washing is performed for varying durations and frequencies depending on historic operating practice and feedstock contaminant levels. Typical duration is from ten minutes to eight hours and typical frequency is from once every four hours to once per week.

It is also typical to set the duration based on the visual appearance of the effluent brine during mud washing. In this situation, the effluent brine is visually clear prior to mud washing. The mud wash will be started, thereby discoloring the water with solids and oil from the bottom of the desalter (the "mud") and from any emulsion that is disengaged from the oil-water desalter interphase. The mud wash will be continued until the solids and oil are removed to the extent that the water is clear again, at which point the mud wash is discontinued.

Due to turbulence created in the desalter during the mud washing, it is common to entrain some oil and emulsion from the interphase into the desalter brine. This is especially true when solids have accumulated in the bottom of the desalter reducing available water volume and creating uneven water distribution. In addition, the mud itself can contain significant oil attached to solids which makes disposal of the mud a more costly and time consuming proposition.

DESCRIPTION OF THE RELATED ART

U.S. Pat. No. 4,947,885 describes a method of reducing emulsified oil in a crude oil desalter effluent brine by monitoring the brine with a streaming current detector and feeding a water-based, cationic emulsion breaker to the wash water ahead of the desalter, or in the mud wash header at the desalter itself, in proportion to the current of anionic emulsion droplets detected. The feeding of oil-based, nonionic emulsion breakers to either water phase (influent wash water or mud wash water), however, is not taught by this patent.

U.S. Pat. No. 5,256,305 discloses a method of resolving a water-in-oil emulsion in a crude oil desalter by feeding oil-based, nonionic emulsion breakers into the wash water ahead of the desalter. Addition to the mud wash header is not anticipated as that method would not be expected to accomplish the stated objective of improving the separation of water from oil. '305 fails to address the de-oiling of solids at the bottom of the desalter vessel as any oil-based breaker added to the wash water and mixed with the crude would have partitioned into the crude by the time the water reached the interphase layer and could never travel through a clear water layer to reach the bottom of the vessel.

U.S. Pat. No. 4,949,743 teaches a method of "fluidizing" oily solid FCC catalyst fines into warm water (140° to 180° F.) using a nonylphenol formaldehyde resin ethoxylate, an emulsifying surfactant such as a fatty alkanolamine and/or an alkylpolyether phosphate, and an organic solvent. This results in a stable aqueous dispersion from which oil does not readily separate.

U.S. Pat. No. 5,085,710 discloses a method of recovering oil from oily solid sludge at the bottom of crude oil storage tanks. The tank is taken out of service and drained of any fluid oil or emulsions. Warm water (145° to 180° F.) containing ethoxylated alkylphenols, ethoxylated caster oils and/or ethoxylated fatty alcohols, acids or amines is then used to transfer heavy oil from the sludge to a floating layer of diluent oil. This process is not done on-line: it applies to the cold-precipitating, paraffinic sludges typical of storage tanks, not the hot-precipitating, asphaltenic sludges typical of desalters. These particular surfactants work only at the lower temperatures required for storage tank cleaning, not in the much hotter (225°–325° F.) and pressurized (100 to 200 psig) environment of a desalter.

DETAILED DESCRIPTION OF THE INVENTION

The present invention provides for methods for treating emulsions and sludge present in a containment vessel. The treatment comprises injecting into the bottom of the vessel an effective emulsion resolving amount of an oil-based demulsifier.

The present invention also provides for treating emulsions comprising bottom sludge and the water-oil interphase in a containment vessel, in which the containment vessel contains a sludge layer, a water or brine layer above the sludge, an emulsion layer above the water/brine layer, and a hydrocarbon layer above the emulsion. The treatment comprises injecting into the bottom of the vessel an effective emulsion resolving amount of an oil-based demulsifier. These treatments result in reduced oil and emulsion entrainment in the effluent brine leaving the containment vessel, which is typically a desalter.

For purposes of the present invention, the oil-based demulsifier can be defined as a compound or a combination or mixture of compounds that function to clean oils from the solids that stabilize emulsions and that comprise the sludge and to resolve/break the interphasal water-oil emulsion.

Examples of oil-based demulsifiers that possess both these functionalities include but are not limited to alkoxylate compounds such as alkylphenol alkoxylates, alkylamine alkoxylates, alkylol alkoxylates with or without crosslinking with aldehydes, di- or multifunctional acids, epoxides, isocyanates, etc. A particularly preferred oil-based demulsifier is a mixture of ethoxylates of poly(propylene oxide) and nonylphenol crosslinked with formaldehyde.

For purposes of the present invention, sludge can be defined as oil coated solid particles that are commonly found in crude oil including but not limited to sand, silt, drilling mud, iron oxide, iron sulfide, heavy asphaltenic compounds, and high molecular weight polyaromatic, carboxylic, sulfide, or amine compounds. These solid particles, when coated with oil, will compact on the bottom of the containment vessel and form the sludge. Typically, these compounds will have an overall density greater than the water or the brine in which they reside.

For purposes of the present invention, the phrase "an effective emulsion resolving amount" is that amount of oil-based demulsifier which will clean oils from the solids that comprise the sludge and break the interphasal oil-water emulsion. Typically, this amount will range from about 50 parts to about 20,000 parts per million parts of water in the containment vessel.

Figure 1:
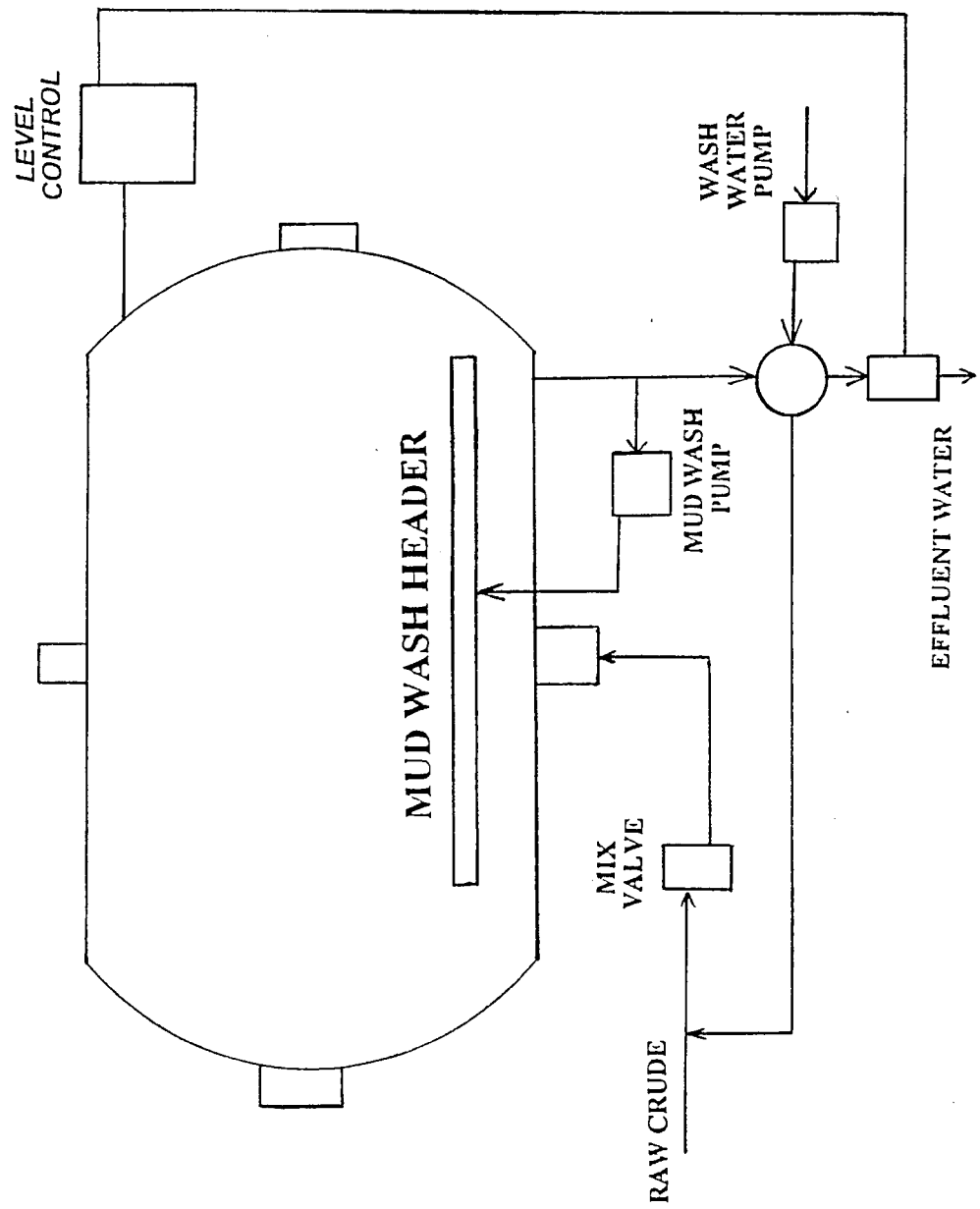
FIG. 1 is a diagram of a mud wash system demonstrating the mud wash headers.

In one embodiment of the present invention, the sludge to be treated is contained at the bottom of a desalter system as shown in FIG. 1. The sludge is at the bottom of the water/brine phase which is situated below the crude in the desalter. The water-oil interphase exists between the water/brine brine layer and the crude. The oil-based demulsifier is injected into the sludge by means of the hot water passing through the mud wash header. This injection method allows the oil-based demulsifier both to contact, in a concentrated form, both the sludge where it is added, and subsequently to diffuse or be carried by oil droplets up through the water/brine layer to contact the water-oil interphase. This method allows for treatment of emulsions in both the sludge and the water-oil interphase with the injection of the oil-based demulsifier. In the absence of this injection, the cleaning of the oil-coated solids (sludge) will remain difficult and the continued use of the mud wash will stir up oils from the sludge and cause the effluent brine to be increasingly oily, thus increasing treatment time and cost.

To demonstrate the efficacy of the present invention, the following examples are intended to show that efficacy and should not be construed as limiting the scope of the invention.

Figure 2:
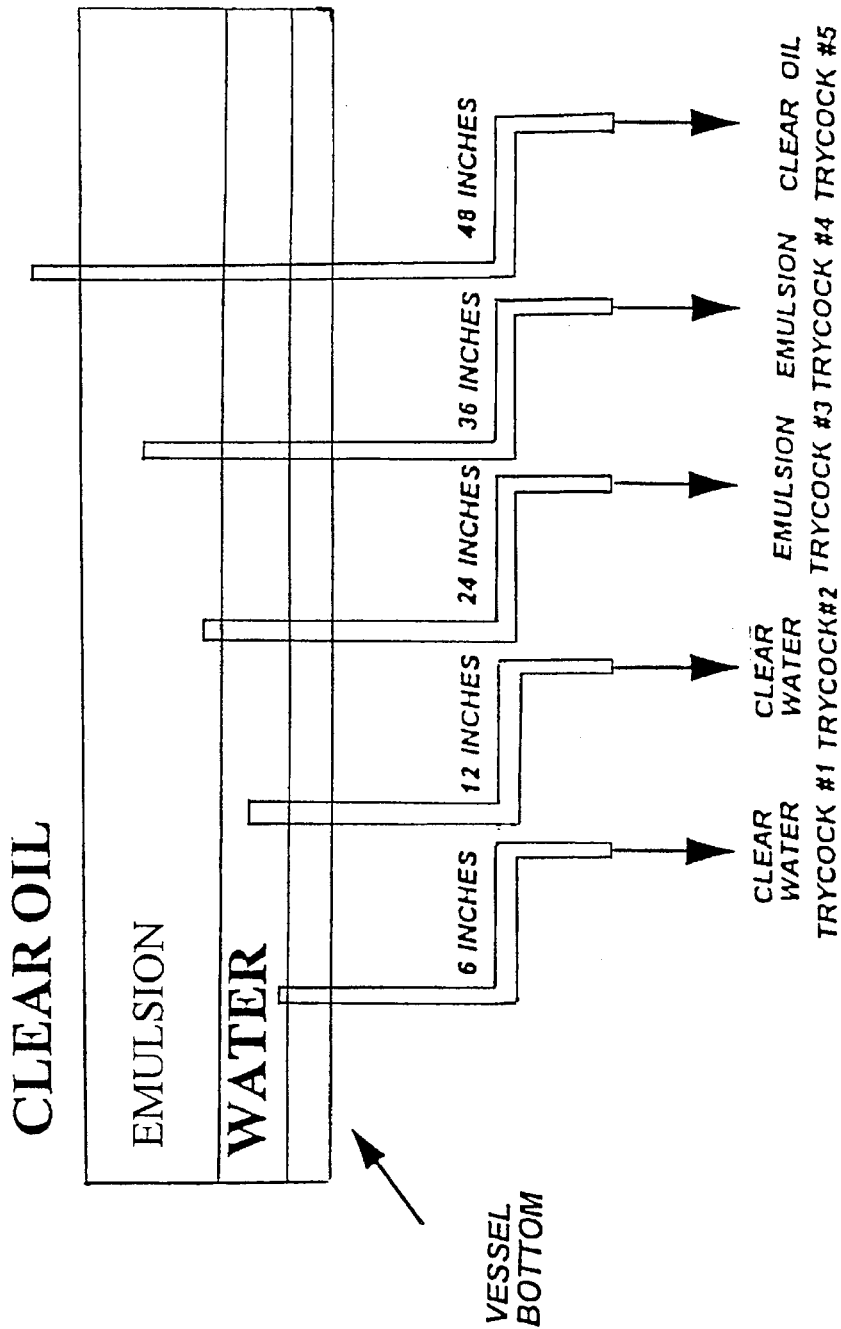
FIG. 2 is a diagram of the trycock sample valves attached to the containment vessel bottom.

A Southern refinery began to experience poor desalter performance due to a buildup of emulsion, including significant mud (sludge) buildup due to inadequate mud washing coupled with the processing of high solids content crude oil. This performance degradation comprised continuous oil entrainment of 10 to 30% in the desalter effluent brine, despite the fact that clear water was sampled at the number 1 and 2 try-cock sample valves above the bottom (see FIG. 2) even while the effluent brine was oily, and an extremely narrow desalter interfacial level control operating band of three inches. Operation below this band resulted in increased effluent brine oil content greater than 30% while operation above this level carried significant amounts of water out with the desalted crude. The desalter had been operating in this manner for approximately one month.

Various alternative mechanical and chemical solutions were attempted, including: increasing the desalter level; increasing mud wash duration up to 8 hours (from typically 10 to 15 minutes); increasing mud wash frequency to up to 3 times per day (from typically once per day) such that the mud wash was operated continuously for several days; doubling mud wash jet velocity by shutting off half the mud wash header inlets; and increasing the feed rate of the emulsion breaker added to the incoming crude stream from 10 ppm up to 50 ppm. None of these modifications resulted in any significant improvement in performance.

Figure 3:
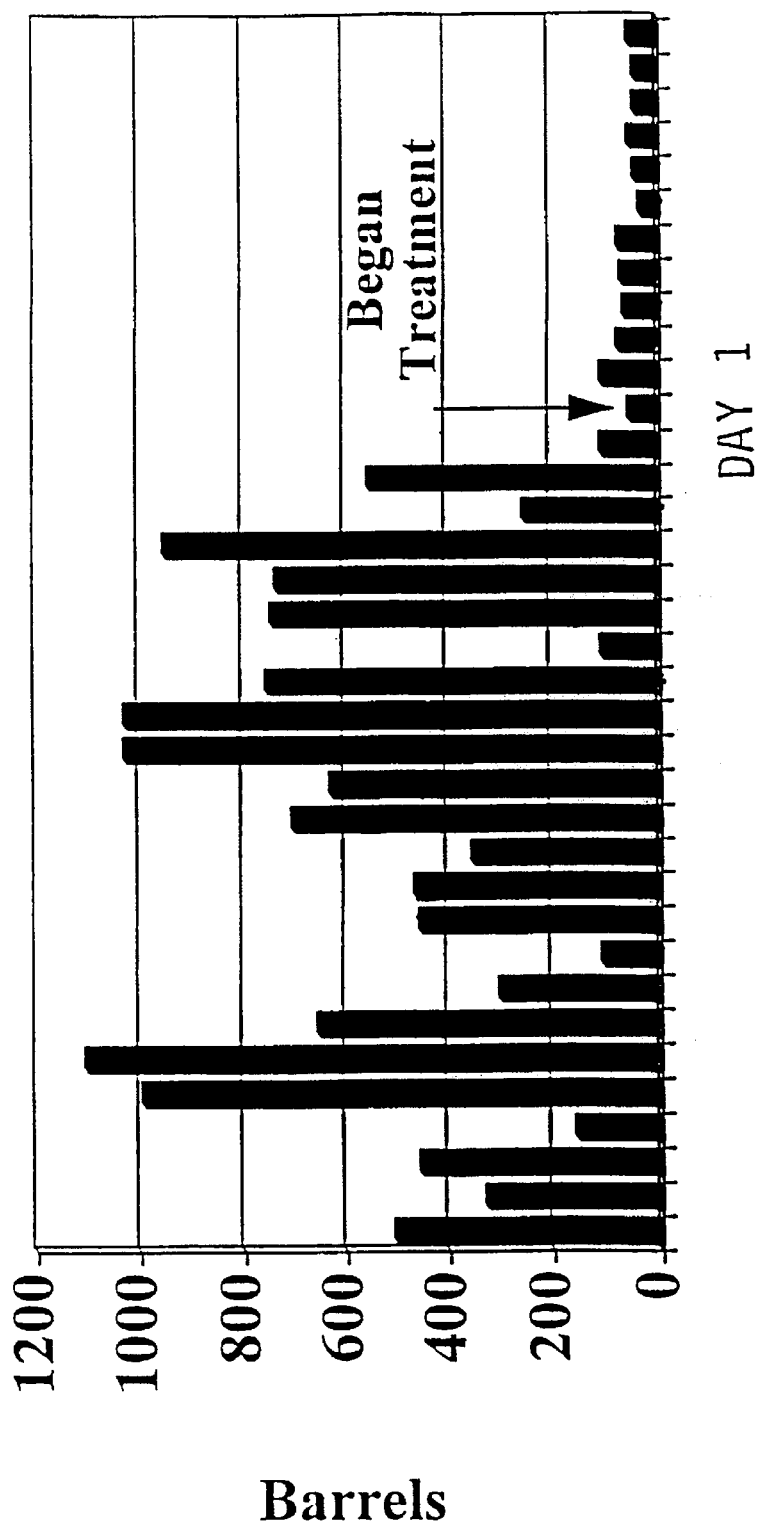
FIG. 3 is a graph of barrels of API oil skimmings versus days demonstrating the reduction in oil output after utilizing the methods of the present invention.

The inventive treatment was then attempted. A blend of poly(propylene oxide) and nonylphenol-formaldehyde resin ethoxylates was injected into the desalter mud wash header during the mud wash at a rate of 1000 ppm based on the total water flow through the mud wash header, which was approximately 10% of the total water throughput or 0.8% of the crude oil throughput. Mud washing was applied consistently for one hour, twice per day so peak flow rate was 12 times higher. This addition rate of oil-based demulsifier is equivalent to about 8 ppm based on oil flow to the desalter on a continuous flow basis or 96 ppm on a peak flow basis. This was continued for a period of thirteen days, After the first day of the inventive treatment, the effluent brine from the desalter was noticeably clear with no entrained oil detectable by visual observation. The effluent brine from this desalter along with other refinery process streams is routed through an API separator. Oil is disengaged from these water streams in the API separator through gravity separation. The oil is skimmed from the API separator and collected in a holding vessel. The amount of oil collected in this holding vessel is measured on a daily basis. As shown in FIG. 3, the amount of oil collected in this holding basin after addition of the oil-based demulsifier to the mud wash was begun (designated Day 1) is dramatically lower than that amount collected when the desalter was treated by the other means.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for resolving emulsions in a bottom sludge and a water-oil interphase present in a containment vessel wherein said containment vessel contains a bottom sludge layer, a water or brine layer, a water-oil interphase layer, and a top crude oil layer comprising injecting into said bottom sludge through mud wash headers an effective emulsion resolving amount of an oil-based demulsifier.

2. The method as claimed in claim 1 wherein said oil-based demulsifier is selected from the group consisting of a compound or combination of compounds that clean oils from solids and resolve interphasal water-oil emulsions.

3. The method as claimed in claim 2 wherein said oil-based demulsifier is selected from the group consisting of alkylphenol alkoxylates, alkylamine alkoxylates, and alkylol alkoxylates with or without crosslinking with aldehydes, di- or multifunctional acids, epoxides, or isocyanates.

4. The method as claimed in claim 2 wherein said oil-based demulsifier is a mixture of ethoxylates of poly(propylene oxide) and nonylphenol crosslinked with formaldehyde.

5. The method as claimed in claim 1 wherein said sludge comprises oil coated solids selected from the group consisting of sand, silt, drilling mud, iron oxide, iron sulfide, heavy asphaltenic compounds, and heavy polyaromatic, carboxylic, sulfide and amine compounds.

6. The method as claimed in claim 1 wherein said oil-based demulsifier is injected in an amount ranging from about 50 parts to about 20,000 parts per million parts of water in said containment vessel.

7. The method as claimed in claim 1 wherein said containment vessel is an oil-water separator operating at a temperature of about 180° F. to about 400° F.

8. The method as claimed in claim 7 wherein said containment vessel is a refiner crude oil desalter.

* * * * *